Fig. 4

Oct. 4, 1932.   W. A. PARR   1,881,126
AUTOMATIC HAMBURGER FORMING AND FRYING MACHINE
Filed Sept. 16, 1930   11 Sheets-Sheet 5

Fig. 5.

INVENTOR.
Webster A. Parr,
BY Harry C. Schroeder
ATTORNEY

Oct. 4, 1932. W. A. PARR 1,881,126
AUTOMATIC HAMBURGER FORMING AND FRYING MACHINE
Filed Sept. 16, 1930 11 Sheets-Sheet 6

Fig. 6

INVENTOR.
Webster A. Parr.
BY Harry C. Schroeder,
ATTORNEY

Oct. 4, 1932.  W. A. PARR  1,881,126
AUTOMATIC HAMBURGER FORMING AND FRYING MACHINE
Filed Sept. 16, 1930   11 Sheets-Sheet 7

Fig. 7.

INVENTOR.
Webster A. Parr.
BY
Harry C. Schroeder.
ATTORNEY

Oct. 4, 1932.  W. A. PARR  1,881,126
AUTOMATIC HAMBURGER FORMING AND FRYING MACHINE
Filed Sept. 16, 1930  11 Sheets-Sheet 8

Oct. 4, 1932.  W. A. PARR  1,881,126
AUTOMATIC HAMBURGER FORMING AND FRYING MACHINE
Filed Sept. 16, 1930    11 Sheets-Sheet 10

INVENTOR.
Webster A. Parr.
BY Harry C. Schroeder.
ATTORNEY

Patented Oct. 4, 1932

1,881,126

UNITED STATES PATENT OFFICE

WEBSTER A. PARR, OF ALAMEDA, CALIFORNIA, ASSIGNOR TO WEBSTER A. PARR, OF ALAMEDA, CALIFORNIA, DEXTER C. BAKER, OF OAKLAND, CALIFORNIA, CHARLES G. JOHNSON, OF ALAMEDA, CALIFORNIA, AND JAY ERWIN BAKER, OF OAKLAND, CALIFORNIA, A COPARTNERSHIP

AUTOMATIC HAMBURGER FORMING AND FRYING MACHINE

Application filed September 16, 1930. Serial No. 482,278.

This invention is for an automatic hamburger forming and frying machine, and has for its main object the provision of an electrically operated machine which will automatically feed measured portions of hamburger steak onto a hot plate, form the portions into steaks and pass the steaks between electrical heating units where the steaks are properly fried, after which they are automatically ejected from the hot plate onto a receiving plate or pan.

Another object of the invention is to provide a machine which is portable, conveniently operated, and which may be connected to an electric circuit by means of the ordinary appliance plug.

A further object of the invention is to provide a machine as outlined in which a hopper may be filled with hamburger steak and which will then automatically form and fry hamburger steaks ready to be made up into sandwiches at a rapid and uniform rate, and in which the rate of cooking may be regulated to provide the best results.

The invention consists primarily of a case mounted on casters and divided into an upper and a lower compartment, the upper compartment being glass enclosed with hinged panels to provide access to the interior, and containing the meat hopper, measuring and forming apparatus, hot plate and heating units. The lower compartment is enclosed with non-transparent material and containing the motor and driving mechanism. A series of switches are provided on the side of the case for controlling the motor and heating units. A plug-in cord connects the device in circuit with a source of electric current.

The mechanism contained within the upper compartment, includes a hopper for containing the meat properly chopped and mixed with the requisite amount of seasoning and onions, a plunger within the hopper for forcing the meat in definite portions out of the bottom of the hopper, a knife to cut off the portion ejected, which drops onto the hot plate which is of circular form centrally pivoted, and which is moved about the pivot in angular stages, the first movement moving the portion under a steak former, which consists of a plunger having a long pitch thread, with a platen at the lower end and a knife rotated by the threaded plunger for cutting the steak free from the platen. A heating unit is disposed above and in spaced relation to the hot plate and a similar heating unit is disposed immediately underneath the hot plate, the heating unit comprising substantially a half ring. The next movement of the hot plate carries the steak between the heating units where cooking begins. A succession of angular movements gradually carries the steak out from the other end of the heating units, when a scraper moves across the surface of the hot plate removing the fried hamburger from the hot plate and depositing it on a plate or platter. Mechanism for operating the devices enumerated and an electric motor are located in the lower compartment.

The invention is adequately illustrated in the accompanying drawings in which.

Similar reference characters are used to designate similar parts throughout the several views.

The cabinet consists of a framework of structural angles 25, the vertical members of which extend downwardly to form legs 26 on which are swively mounted casters 27. The cabinet consists of a lower compartment 28 having a floor 29 and enclosed by means of non-transparent panels 30 which are secured in position by means of bolts and wing nuts 31.

The upper compartment 32 has a floor 33 and removable cover 34, the sides being enclosed by means of glazed doors 35 hinged as at 36.

A motor 37 is coupled to the speed reducing unit 38 by means of a flexible coupling 39 and bolted to the floor 29 as at 40.

Figure 17:
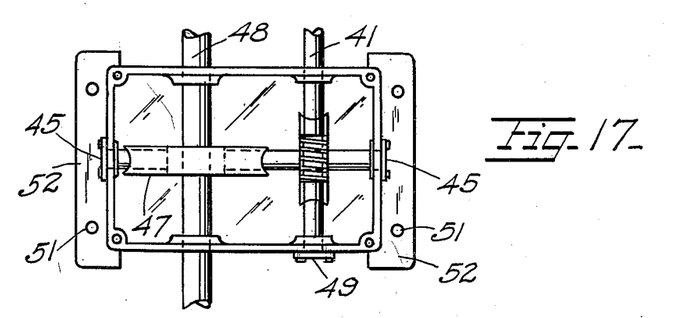
Fig. 17 is a sectional plan view taken through the speed reduction box.
Figure 18:
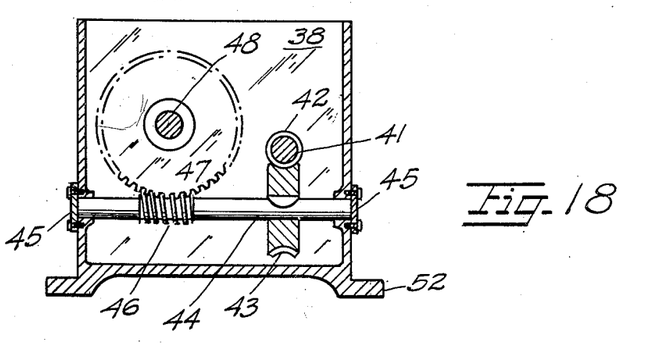
Fig. 18 is a sectional elevation taken through the speed reduction box.

The speed reducing unit consists of a housing 38 having rotatably mounted therein a drive shaft 41 coupled to the motor 37 by means of coupling 39. Integral with or fixed to drive shaft 41 is a worm 42 meshing with a worm gear 43 which is mounted on the shaft 44 and rotatable therewith, the ends of the bearings having closure caps 45. Integral with shaft 44 is a worm 46 which meshes with a worm gear 47 fixed on shaft 48, both ends of which extend through the housing 38. An end closure 49 is provided for one end of drive shaft 41. The casing is mounted on floor 29 by means of bolts 50 through holes 51 in flanges 52 on the housing 38.

The hot plate consists of a circular disc 53 having depending skirts 54 and is fixedly mounted on a vertical shaft 55, which is rotatably mounted in a bearing 56 mounted on floor 33 and extending downwardly, the lower end being mounted in a step bearing 57 fixed to the floor 29.

Figure 1:
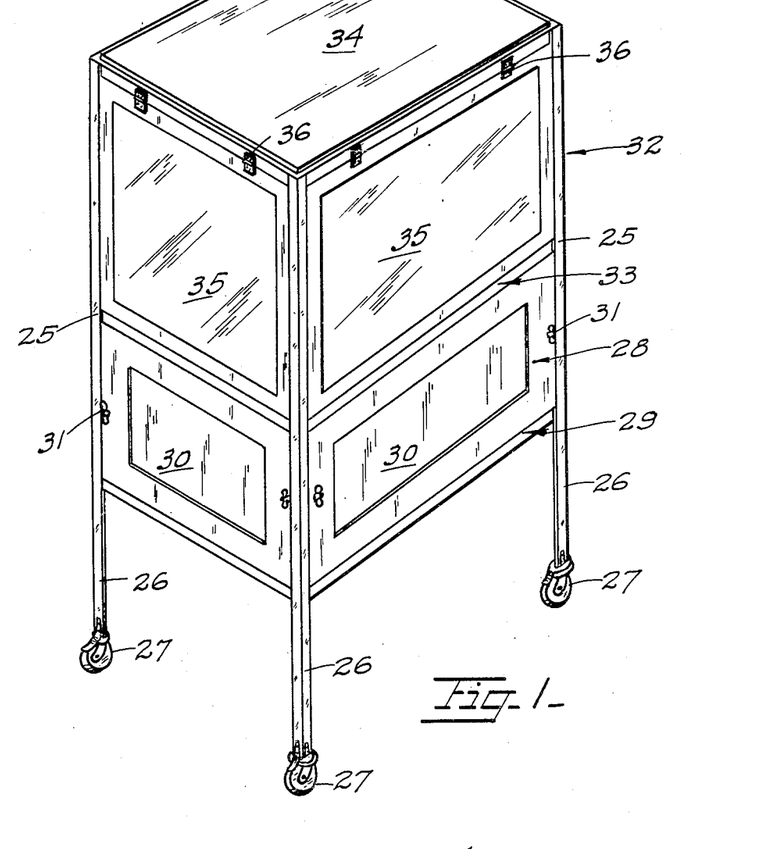
Fig. 1 is a perspective view of the invention in its entirety and completely enclosed to protect the interior from dust and dirt.
Figure 2:
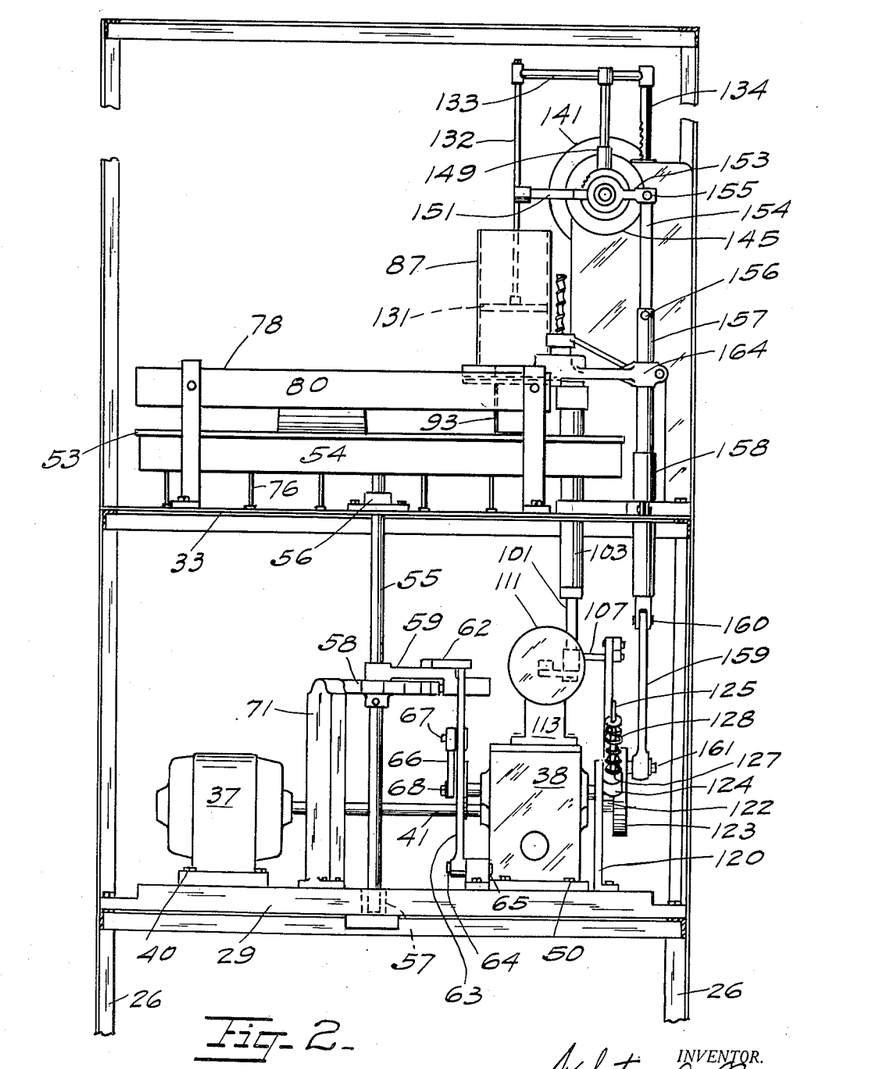
Fig. 2 is a rear elevation of the invention with panels removed to show the interior mechanism.
Figure 3:
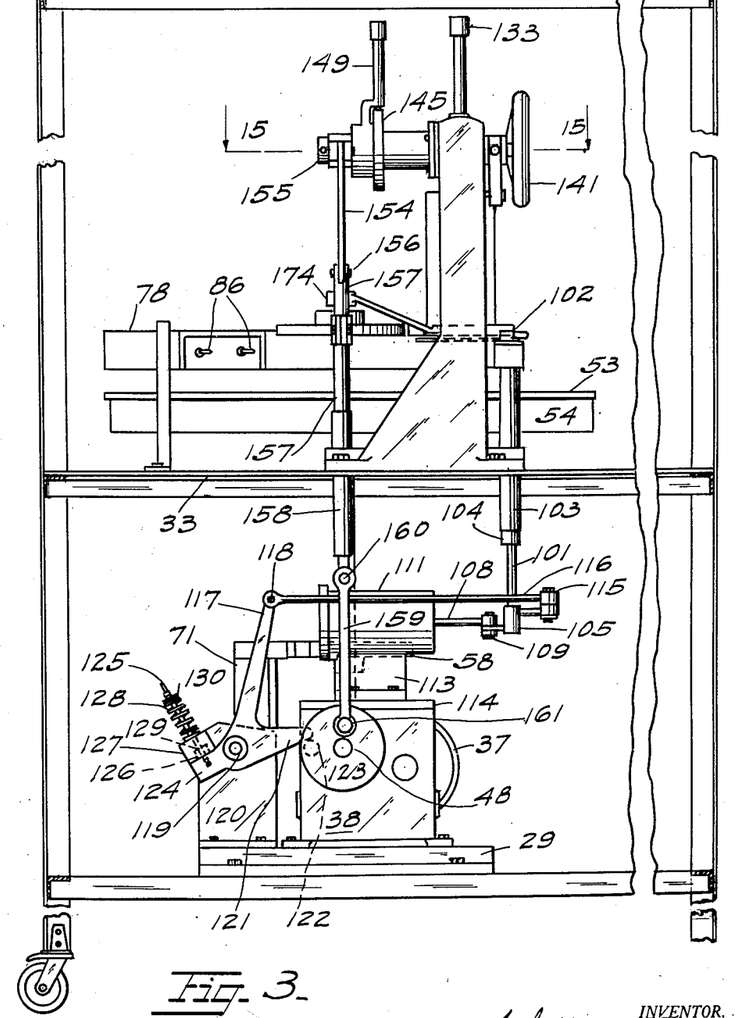
Fig. 3 is a left hand side elevation with panels removed and indicating clearly the interior mechanism.
Figure 4:
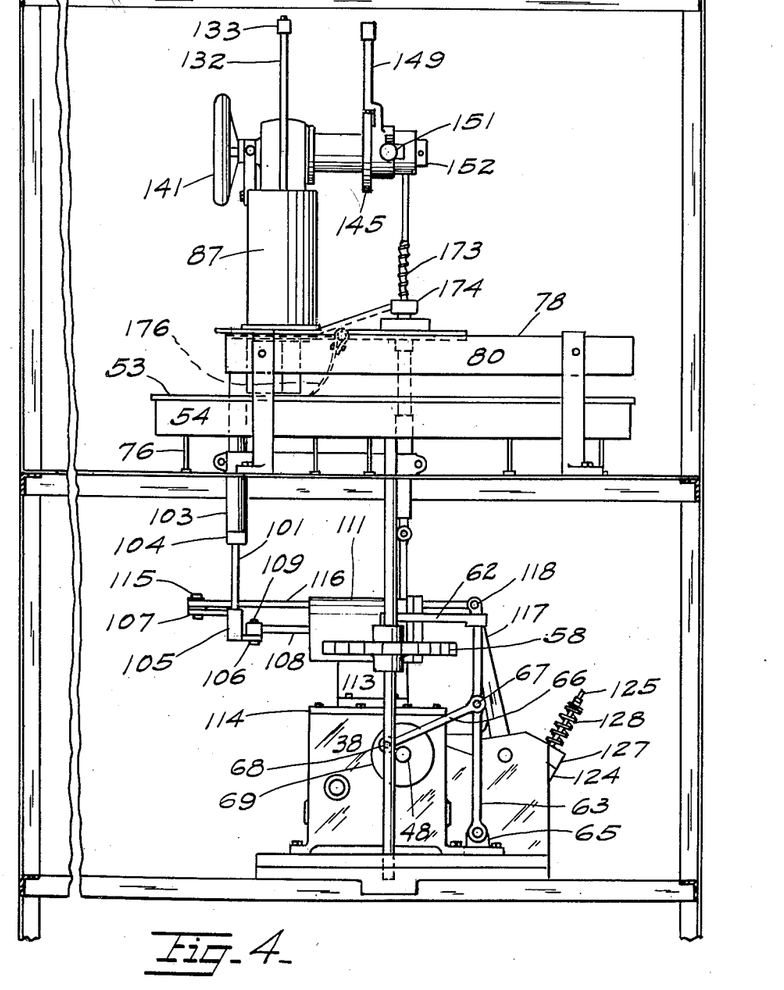
Fig. 4 is a right hand side elevation with panels removed and indicating clearly the interior mechanism.
Figure 5:
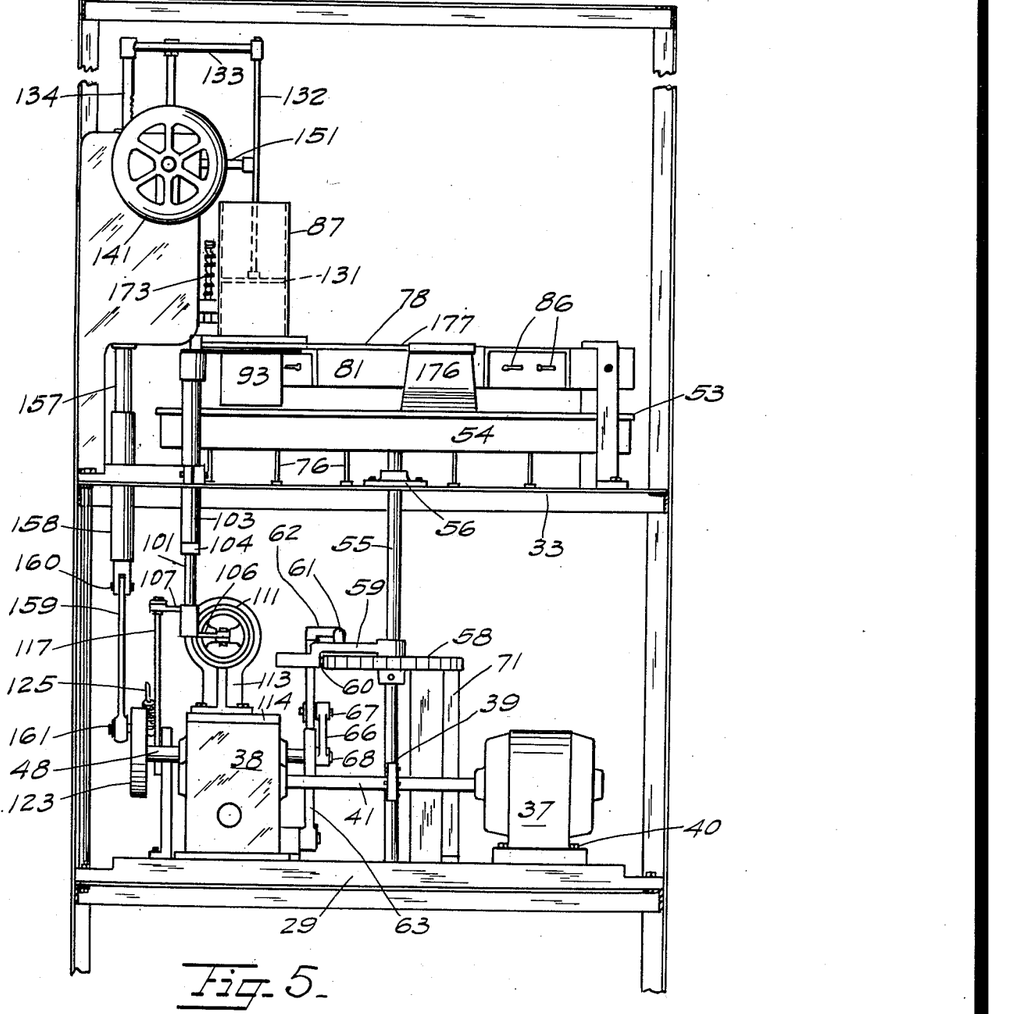
Fig. 5 is a front elevation with panels removed, the fried hamburgers being removed from the hot plate at this point.
Figure 6:
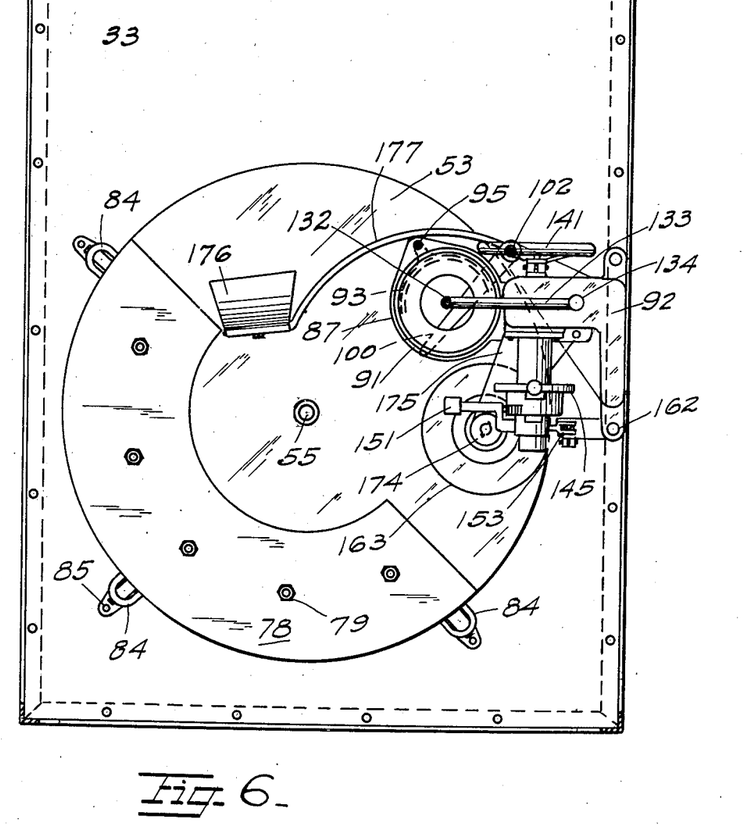
Fig. 6 is a top plan view of the upper compartment with cover removed and showing the hot plate, hopper, former, upper heating unit and scraper.
Figure 7:
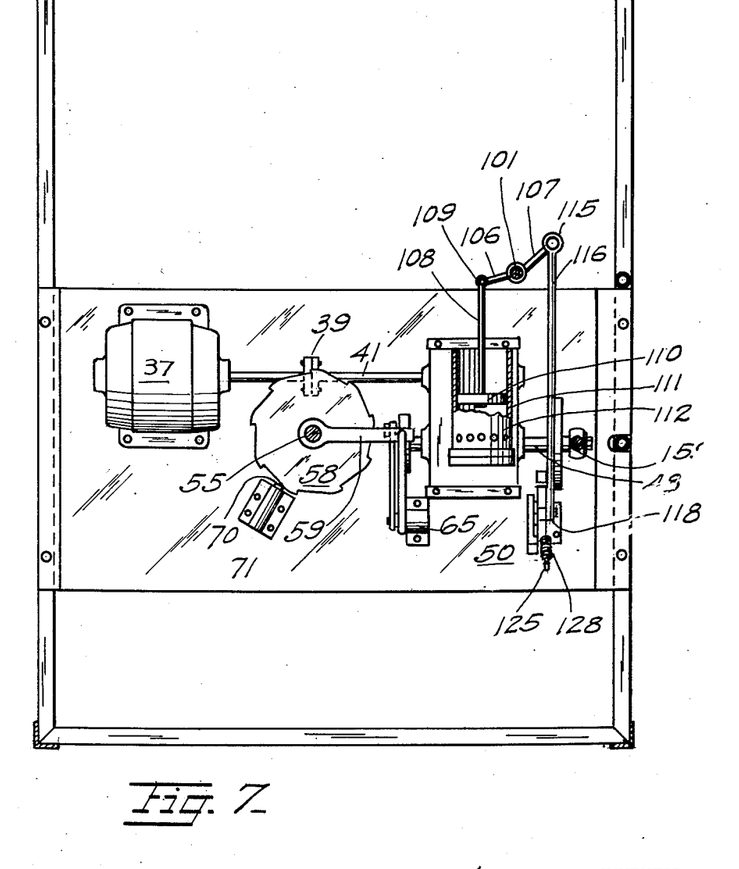
Fig. 7 is a section taken just below the upper compartment, showing the motor, hot plate, operating ratchet, speed reduction and operating mechanism.

The drive mechanism for the hot plate consists of a ratchet 58 fixedly mounted on shaft 55, a ratchet arm 59 rotatably mounted thereon and having a spring actuated plunger pawl 60 adapted to engage the teeth of ratchet 58. A ball joint 61 projecting upwardly from ratchet arm 59 cooperates with a ball socket in the link 62, the opposite end of which is provided with a similar ball socket cooperating with a ball end on the rocker arm 63 which is pivotally mounted as at 64 in a bearing 65 fixed to floor 29. A connecting rod 66 is pivotally connected to the rocker arm 63 as at 67 and has its opposite end pivotally mounted on a crank pin 68 on the crank disc 69 which is fixed on one projecting end of shaft 48. A back stop pawl consisting of a spring operated plunger 70 slidably mounted in the upper end of bracket 71 which is bolted to the floor 29 is provided to prevent return movement of the hot plate 53. Shaft 48 together with crank disc 69 and crank pin 68 rotates at constant speed, and through the connecting rod 66 rocks the rocker arm 63 about pivot 64, transmitting the motion to ratchet arm 59 by means of link 62, causing a reciprocating angular motion of ratchet arm 59. The pawl 60 on forward motion engages a tooth or ratchet 58 and through the shaft 55 advances hot plate 53 the angular distance of one tooth, pawl 70 engaging a tooth at the completion of a stroke and preventing a retrograde movement of the hot plate.

Figure 10:
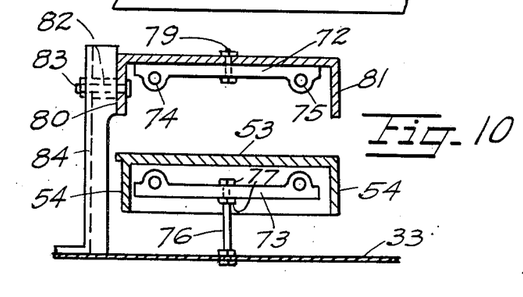
Fig. 10 is a sectional elevation taken through the heating units.

The heating elements for the hot plate consist of two half rings 72 and 73 disposed respectively in spaced relation above and below hot plate 53 and consist of a refractory insulating body provided with two series of apertures 74 and 75 through which the spirally coiled resistance wire is threaded. The lower unit 73 is supported on a plurality of bolt standards 76 which are fixed in the insulating body and floor 33 respectively, as indicated in Fig. 10, apertures being provided through which the bolts pass, being fixed by oppositely disposed units 77.

The upper heating unit is clamped to a supporting plate 78 by bolting by means of the bolts 79. The spirally coiled resistance wire is threaded serially through apertures 74 and returned serially through apertures 75, providing both terminals at one end of the unit. The supporting plate 78 consists of a half ring having depending skirts 80 and 81, the peripheral skirt 80 having apertures 82 for reception of bolts 83 by which the plate is supported by means of brackets 84 which are bolted to floor 33 as at 85. Terminals for the upper heating unit are indicated at 86.

Figure 8:
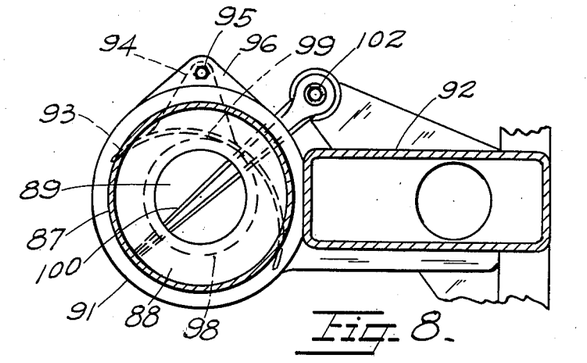
Fig. 8 is a transverse section taken through the hamburger hopper and associated mounting and operating means.
Figure 9:
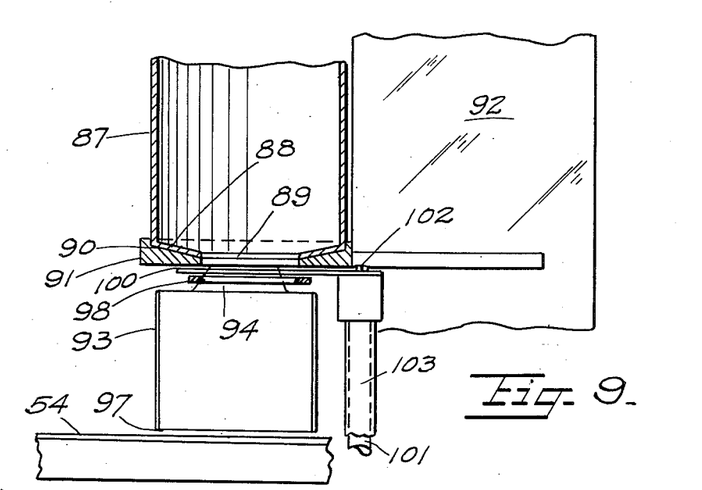
Fig. 9 is a fragmentary sectional elevation taken through the hopper mounting plate, and knife and indicating the portion retainer below.

The hopper consists of a cylindrical vessel 87 having a sloping bottom 88 with a central aperture 89 and is removably mounted in a recess 90 conforming to the bottom 88, in the base 91 which forms an integral part of the housing 92. Removably fixed to the bottom of base 91 is a guard 93 of substantially semicircular form having an ear 94 whereby it is bolted by means of the bolt 95 in cooperation with the ear 96 on base 91, the lower edge of the guard 93 clearing the hot plate 53 as at 97. A ring 98 is spacedly related to the bottom of base 91 and has a central aperture in registry with aperture 89 in hopper 87, a similar registerable aperture being provided in base 91. The ring 98 is fixed to ear 94 as at 99 by welding or similar means. A cutter 100 is adapted to slidably reciprocate between the ring 98 and base 91.

The cutter 100 is mounted on a shaft 101 and fixedly related thereto as at 102, the shaft being rotatable in the bearing sleeve 103 which is fixed in the base of housing 92 and passes through floor 33, thrust collar 104 being provided above and below sleeve 103 to retain the cutter 100 in proper registry between ring 98 and base 91. Shaft 101 has fixed to the lower end a bell crank lever 105 having arms 106 and 107. Arm 106 is pivotally connected to a piston rod 108 at 109 the opposite end of which has fixedly mounted thereon a piston 110 which is slidable within the cylinder 111.

Cylinder 111 is provided with a plurality of apertures 112 and has the mounting standard 113 integral therewith, which is mounted on the cover 114 of speed reducing unit 38.

Arm 107 has pivotally connected thereto at 115 a connecting rod 116, the opposite end of which is connected to the arm 117 as at 118 of a triple arm lever which is pivoted at 119 to a bracket 120 which is mounted on the floor 29. An arm 121 is adapted to cooperate with a pin 122 projecting backwardly from the disc 123 which is fixedly mounted on shaft 48 opposite disc 69 and rotatable therewith. The third arm 124 has fixed therein a spring rod 125 which is slidable in an aperture 126 in the ear 127 which is integral with the bracket 120 and projects outwardly therefrom. A compression spring 128 is seated in a socket 129 the opposite end being retained by a washer 130.

Figure 16:
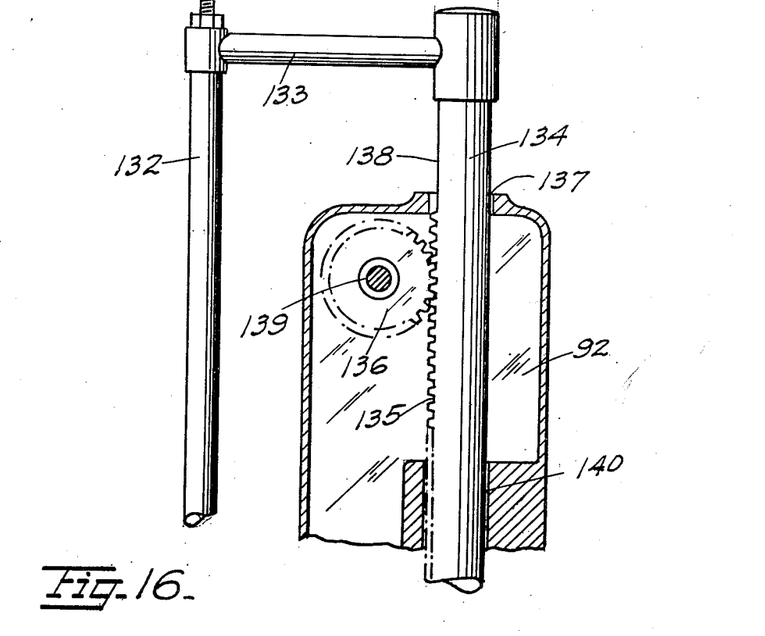
Fig. 16 is a sectional elevation taken through the hopper plunger operating housing and indicating the rack, pinion, head rod and plunger.

The hamburger portioning device consists of a piston 131 slidable within the cylinder 87 and fixed to the lower end of plunger rod 132 the opposite end of which is fixed in the head bar 133, which has fixed in the opposite end a rack 134 which has teeth 135 formed in one face adapted to cooperate with the gear 136 and is slidably mounted in the housing 92 at 137, the teeth being cut away from the portion 138 of the rack to prevent overfeeding of the rack and consequent damage to the machine. Gear 136 is fixedly mounted on a shaft 139 and rotatable therewith. The rack 134 is provided with a bearing 140 to retain the mechanism in alignment, and is slidable therein.

Figures 11, 12:
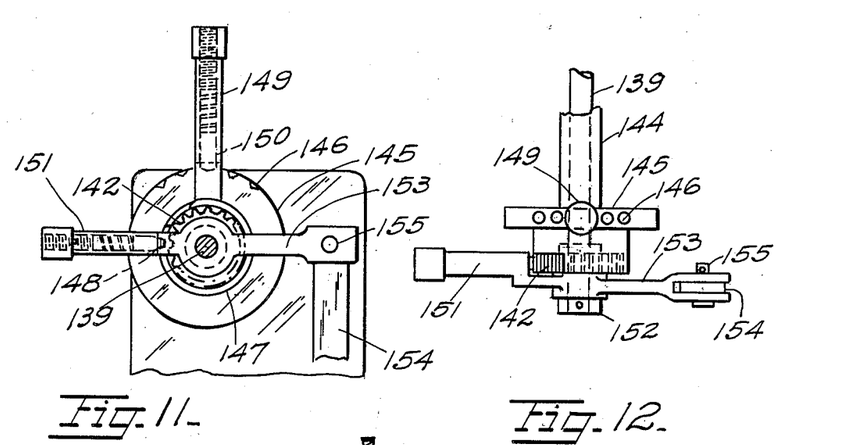
Fig. 11 is a fragmentary elevation showing the hopper feeding ratchet, pawl and feed control.
Fig. 12 is a top plan view of the mechanism indicated in Fig. 11.
Figure 15:
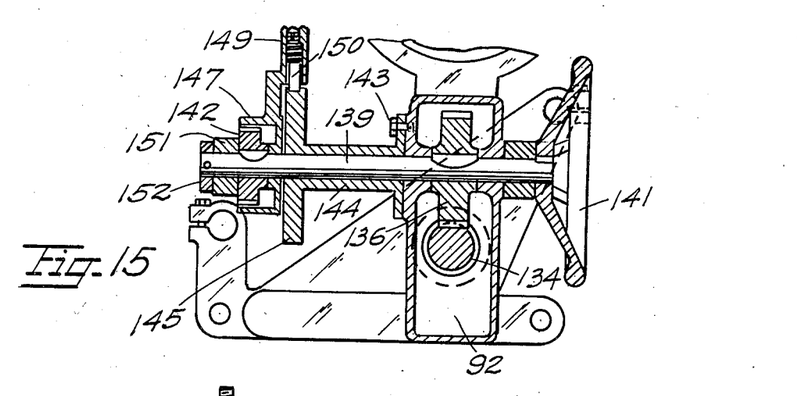
Fig. 15 is a sectional plan view taken through the hopper plunger operating mechanism and is taken on line 15—15 of Fig. 3.

The driving mechanism for the rack is indicated more clearly in Fig. 15, a handwheel 141 being fixed to one end of shaft 139 for manual adjustment of the piston 131 within the cylinder 87 and a ratchet 142 is fixed to shaft 139 adjacent the opposite end. Fixed to housing 92 as at 143 is a sleeve 144, the end of which is provided with a disc 145 having a series of indents 146 angularly spaced in relation to the teeth of ratchet 142. Rotatably mounted between the disc 145 and ratchet 142 is a feed regulating sleeve consisting of a cylindrical portion 147 partly encompassing the ratchet 142, a space being open as indicated in Fig. 11 to permit engagement of the pawl 148 throughout the greatest length of stroke desired. An integral arm 149 is provided with a spring operated plunger pawl 150 adapted to cooperate with indents 146 on disc 145. A ratchet arm 151 is rotatably mounted on shaft 139, a retaining collar 152 being fixed on the end of the shaft. An arm 153 is integral with the hub of ratchet arm 151 and has pivoted thereto a connecting rod 154 as indicated at 155, the opposite end of which is pivotally connected at 156 to a reciprocating rod 157 which is slidably mounted in a sleeve bearing 158 and pivotally connected to a connecting rod 159 as indicated at 160, the opposite end of connecting rod 159 being pivotally connected to the crank 161 on disc 123. Bracket 92 is bolted to floor 33 as indicated at 162.

Figure 13:
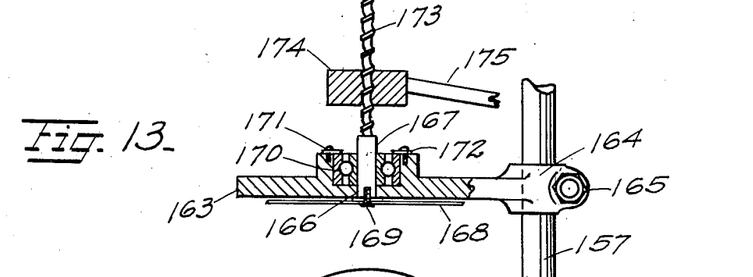
Fig. 13 is a sectional elevation of the steak former.
Figure 14:
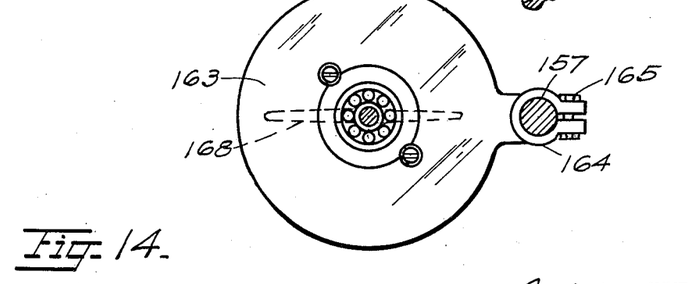
Fig. 14 is a top plan view of Fig. 13.

The forming device is best indicated in Figs. 13 and 14 and consists of a disc 163 provided with a clamp eye 164 and a clamp bolt 165 for adjustably securing the disc to the reciprocating rod 157. Disc 163 has a central bore 166 to rotatably receive the vertical shaft 167, to the end of which a cutter 168 is fixed as at 169. A counterbore 170 in disc 163 receives a ball bearing 171 which is retained therein by a plate 172 secured by means of screws indicated, the inner race of ball bearing 171 being pressed on shaft 167 and rotatable therewith.

The upper end of shaft 167 is provided with a long pitch thread 173 which cooperates with a mating thread in hub 174 which is integral with an arm 175 and fixed to or forming a part of housing 92.

The fried hamburger ejector consists of an inclined blade 176 fixed to an arm 177 which is fixedly secured to the upper end of shaft 101.

The wiring of the motor and heating units consists of the usual system of switches and leads, a double pole, single throw switch being placed in circuit with the apparatus, and a multiple point switch adapted for series or parallel connection of the heating units.

The operation of the device is as follows: The piston 131 is drawn upwardly out of hopper 87 by means of handwheel 141, and the hopper removed from its supporting base 91, filled with raw hamburger and replaced in the supporting base, piston 131 being adjusted down by means of handwheel 141. Disc 163 is then adjusted on rod 157 by means of clamp 164 to form the thickness of hamburger desired, and arm 149 adjusted on disc 145 to feed the proper portion at each stroke.

The heating units are next switched into circuit and the motor started, which drives shaft 48 through the reduction comprising worm 42, worm gear 43, worm 46 and worm gear 47. Crank 161 draws down connecting rod 159, reciprocating rod 157, connecting rod 154 and lever 153. Pawl 148 rides over cylindrical member 147 and dropping over the edge of the open portion engages the ratchet 142, partly rotating shaft 139, and coincidently gear 136, forcing rack 134 down, and coincidently therewith rod 132 and piston 131, forcing the raw hamburger through aperture 89, equal to one portion. On the return stroke, pin 122 engages lever 121 forcing it upward and turns the shaft 101 through a partial revolution, cutting off the portion by means of cutter 100 and coincidently swinging arm 177 and moving the scraper 176 across the hot plate 53 removing the fried hamburger after reaching that point, the return movement being actuated by spring 128 and retarded by the dash pot 111 through lever 106.

Crank 68 through connecting rod 66 and lever 63 reciprocates ratchet arm 59, pawl 60, engaging the ratchet 58 advancing it one tooth and coincidently an equal angular distance of the hot plate 53. Disc 163 is drawn down by shaft 157, the threaded end 173 of shaft 167 being drawn through hub 174, causing the cutter 168 to rotate, thus clearing the bottom of the disc of the adhering hamburger when formed between the disc and hot plate. Successive movements of the hot plate gradually carry the hamburgers through between the heating units whereby they become thoroughly cooked, being ejected from the hot plate by the scraper 176.

Having described an operative method of constructing and operating the invention, it will be understood that variations in construction and arrangement of parts which are consistent with the appended claims may be resorted to without departing from the spirit or scope of the invention or sacrificing any of its advantages.

What I claim is:

1. A hamburger forming and frying machine comprising a circular hot plate centrally pivoted and intermittently rotated by means of a ratchet and pawl, a semi-circular heating unit disposed beneath said hot plate, a semi-circular heating unit disposed above and in spaced relation to said hot plate, a cylindrical container for raw hamburger in advance of said heating units, a plunger in said container, means for intermittently feeding said plunger downward, said means consisting of a rack and a pinion operated by means of an adjustable ratchet, a cutter operating transversely adjacent the bottom of said cylindrical container, a disc with rotating cutter for flattening portions of hamburger ejected by successive downward movements of said plunger, and, a scraper adjacent the opposite end of said heating units for removing the fried hamburgers from said hot plate, and, electrically driven means for operating said mechanism.

2. A hamburger forming and frying device comprising a circular hot plate centrally pivoted and intermittently rotated by means of a ratchet and pawl, a semi-circular heating unit disposed beneath said hot plate, a semi-circular heating unit disposed above and in spaced relation to said hot plate, a container for raw hamburger mounted in advance of said heating units and provided with a piston intermittently actuated by means of a ratchet and pawl, hand operated means for retracting said plunger, a cutter beneath said container, a plunger actuated disc for forming said hamburger, a rotary cleaning cutter for said disc, means for removing the cooked hamburgers from said hot plate and electrically driven means for operating said mechanism.

3. A hamburger forming and frying machine, in combination with cooking and apportioning means, forming means consisting of a plunger, a disc adjustably mounted on said plunger and extending over the hot plate of said cooking means, a knife cooperating with the undersurface of said disc, a shaft axially mounted in said disc and having said knife affixed to the lower end thereof and means for rotating said knife coincidently with the downward movement of said plunger.

4. A hamburger forming and frying machine, in combination with cooking and apportioning means, said cooking means comprising a traveling hot plate and stationary heating elements; forming means consisting of a plunger, a disc provided with clamping means adjacent the periphery and adjustably clamped to said plunger, said disc being parallel with said hot plate and extending thereover, a knife cooperating with the undersurface of said disc, a shaft axially disposed and rotatably mounted in said disc, said knife being intermediately fixed to the lower end of said shaft, and means cooperating with the upper end of said shaft for rotating said shaft coincident with movement of said plunger.

5. A hamburger forming and frying machine, in combination with an intermittently rotated horizontal hot plate and stationary heating elements therefor; forming means consisting of a vertically actuated plunger, a disc provided with an extension from the periphery thereof, said extension having means for adjustable mounting on said plunger, said disc being disposed in parallel relation to said hot plate and extending thereover, a knife in juxtaposition to the undersurface of said disc, a shaft axially disposed and rotatably mounted in said disc and having said knife intermediately fixed to the lower end thereof, a screw thread formed on the upper end of said shaft, and a stationary nut cooperating with said screw thread.

6. A hamburger forming and frying machine, in combination with an intermittently rotated, horizontal hot plate and stationary heating elements therefor; apportioning means consisting of a removable hopper having an opening in the bottom thereof, a plunger in said hopper, means for intermittently actuating said plunger, a bracket for said hopper provided with a central opening in registry with said hopper opening, an angularly reciprocating knife cooperating with the lower surface of said bracket and adapted to cut away a protruding portion of meat following actuation of said plunger, a guide below said knife and cooperating with the under surface thereof, said hopper depositing said portion on said hot plate, and forming means for said portion.

7. A hamburger forming and frying machine, in combination with an intermittently rotated, horizontal hot plate and stationary heating elements therefor, apportioning means consisting of a removable hopper having an opening in the bottom thereof and extending over said hot plate, a plunger operated piston in said hopper, means for intermittently actuating said plunger, means for adjusting the stroke of said plunger, a bracket for said hopper having a central aperture in registry with said hopper opening, a reciprocatory knife cooperating with the lower surface of said bracket about said aperture, a guide below said knife and cooperating therewith, means for moving said knife across said opening following actuation of said plunger, said knife being resiliently retracted and forming means for said portion.

8. A hamburger forming and frying machine, in combination with an intermittently rotated, horizontal hot plate and stationary heating elements therefor, and forming means for a portion of hamburger; apportioning means consisting of a removable hopper having an opening in the bottom thereof, a piston in said hopper, a head bar, a plunger rod affixed at one end to said piston and at the other end to said head bar, a rack fixed to said head bar and operating parallel to said plunger rod, a pinion cooperating with said rack, a pinion shaft, a hand wheel at one end of said shaft and an adjustable ratchet at the other end thereof, a pawl and means for actuating said pawl, a bracket having a central aperture registering with said hopper opening, a knife in juxtaposition to the undersurface of said bracket about said aperture, a ring guide cooperating with the undersurface of said knife and means for reciprocating said knife following movement of said plunger.

9. A hamburger forming and frying machine comprising in combination with a movable hot plate and heating means therefor, apportioning means consisting of a hopper having a discharge opening and an intermittently actuated piston, a knife pivotally mounted beneath said discharge opening, a guide ring cooperating with the undersurface of said knife, positive means for moving said knife across said opening, and resilient means for retracting said knife.

10. A hamburger forming and frying machine comprising in combination with a movable hot plate and heating means therefor, apportioning means comprising a hopper and an intermittently actuated piston, a discharge opening in said hopper, a supporting bracket for said hopper having an opening in registry with said discharge opening, a knife cooperating with the undersurface of said bracket, a guide cooperating with the undersurface of said knife, said knife being pivotally mounted on a vertical shaft exteriorly of said opening, positive means for partly rotating said shaft in one direction, resilient means for returning said shaft and means for retarding said shaft against the action of said resilient means.

11. A hamburger forming and frying machine comprising in combination with apportioning and forming means, said apportioning means having an angularly reciprocating knife mounted on a vertical shaft, a rotary hot plate intermittently advanced and a scraper having an arm secured to said vertical shaft for coincident reciprocation, said scraper being backwardly inclined and cooperating with the surface of said hot plate.

12. A hamburger forming and frying machine comprising in combination with an intermittently movable hot plate, and forming and apportioning means, a scraper cooperating with the surface of said hot plate and movable transversely thereof, said scraper being mounted on an arm, a vertical shaft, said arm being secured to said shaft, positive means for partly rotating said shaft in one direction, and retarded resilient means for returning said shaft to its original position.

13. A hamburger forming and frying machine comprising in combination with an intermittently movable hot plate and apportioning and forming means, and a scraper cooperating with the surface of said hot plate, said apportioning means having a reciprocatory knife for cutting off portions of hamburger, means for actuating said knife and said scraper comprising a continuously rotating crank arm having a crank pin, a bell crank lever resiliently retained in one position, one arm of said bell crank lever being adapted to cooperate with said crank arm during a portion of its travel through each revolution, the other arm of said bell crank lever having a connecting rod pivotally secured thereto, a vertical shaft having secured at one end, said knife and said scraper and at the other end a second bell crank lever, a connecting rod between said bell crank levers and a dash pot cooperating with the return movement of said second bell crank lever.

14. In combination with a hamburger forming and frying machine comprising a hot plate, apportioning means provided with an angularly reciprocating knife, forming means, and an angularly reciprocating scraper for removing hamburgers, actuating means for said knife and said scraper comprising a continuously rotating disc, a crank pin on said disc, a bell crank lever having one arm in cooperative relation to said crank pin during a portion of its travel through each revolution resilient means for retracting said arm, a vertical shaft having said knife and said scraper secured to the upper end, a lever secured to the lower end, a connection between said lever and the other arm of said bell crank lever and means for retarding the action of said resilient means.

15. A hamburger forming and frying machine comprising a circular hot plate centrally pivoted and intermittently rotated, and heating means therefore, a removable hopper mounted in advance of said heating means, an intermittently actuated piston in said hopper, an intermittently actuated reciprocatory knife operating under the discharge opening in said hopper, forming means disposed intermediately of said hopper and one end of said heating means, hamburger removing means disposed intermediately of said hopper and the other end of said heating means, and power means for actuating said machine.

16. A hamburger forming and frying machine comprising a circular hot plate centrally pivoted and intermittently rotated, a semi-circular heating element disposed beneath said hot plate and adjacent thereto, a semi-circular heating element disposed above said hot plate and in spaced relation thereto, apportioning means comprising a hopper having an intermittently actuated piston and a discharge opening, an intermittently actuated reciprocatory knife operating under the discharge opening in said hopper, forming means disposed intermediately of said hopper and one end of said heating means, said forming means comprising a disc with rotating cutter for flattening portions of hamburger ejected by successive downward movements of said piston, hamburger removing means disposed intermediately of said hopper and the other end of said heating elements, and driving means for said machine.

17. A hamburger forming and frying machine comprising a circular hot plate centrally pivoted and intermittently rotated, and heating means therefore, apportioning means comprising a removable hopper having a discharge opening in the bottom thereof a supporting bracket for said hopper provided with an opening in registry with said hopper opening, an angularly reciprocating knife cooperating with the lower surface of said bracket, a piston in said hopper, means for intermittently feeding said piston downwardly, means for moving said knife across said opening following actuation of said plunger, said knife being resiliently retracted, forming means comprising a plunger, a disc provided with clamping means adjacent the periphery and adjustably clamped to said plunger, said disc being parallel to said hot plate and extending thereover, a knife cooperating with the undersurface of said disc, means for coincidently rotating said knife with the downward movement of said plunger, a scraper cooperating with the surface of said hot plate and movable transversely thereof, and driving means for said machine.

18. In combination with an intermittently rotated hot plate and stationary heating elements therefore, a removable hopper having a discharge opening in the bottom thereof, a bracket for said hopper provided with an opening in registry with said discharge opening, an intermittently actuated piston for said hopper a guard depending from said bracket, a ring fixed to said guard in spaced relation to said bracket and said ring across said discharge opening a pivotally mounted knife, means for moving said knife across said opening following actuation of said piston, said knife being resiliently retracted, means for retarding the retraction of said knife, and forming means disposed intermediately of said hopper and one end of said heating means.

19. In combination with an intermittently rotatable hot plate and stationary heating elements therefore, apportioning means and forming means, said apportioning means having an angularly reciprocating knife mounted on a vertical shaft and resilient means cooperating therewith, a scraper having an arm secured to said vertical shaft and cooperating with the surface of said hot plate, positive means for returning said shaft and means for retarding said shaft against the action of said resilient means.

In testimony whereof I have affixed my signature.

WEBSTER A. PARR.